US012634286B2

(12) United States Patent
Jain et al.

(10) Patent No.: US 12,634,286 B2
(45) Date of Patent: May 19, 2026

(54) GRANULAR SECURE USER ACCESS TO PRIVATE RESOURCES

(71) Applicant: Microsoft Technology Licensing, LLC, Redmond, WA (US)

(72) Inventors: Ashish Jain, Redmond, WA (US); Ronnie Greenstein, Redmond, WA (US); Mordhai Gendelman, Ramat-Gan (IL); Avraham Carmon, Hofit (IL); Sinead C. O'Donovan, Seattle, WA (US); Yair Tor, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 188 days.

(21) Appl. No.: 17/820,166

(22) Filed: Aug. 16, 2022

(65) Prior Publication Data

US 2024/0064147 A1      Feb. 22, 2024

(51) Int. Cl.
*H04L 9/40* (2022.01)

(52) U.S. Cl.
CPC ............ *H04L 63/102* (2013.01); *H04L 63/08* (2013.01); *H04L 63/20* (2013.01)

(58) Field of Classification Search
CPC ........ H04L 63/102; H04L 63/08; H04L 63/20
See application file for complete search history.

(56) References Cited

U.S. PATENT DOCUMENTS

| | | | |
|---|---|---|---|
| 6,308,273 | B1 | 10/2001 | Goertzel et al. |
| 8,406,170 | B2 | 3/2013 | Rune |
| 8,693,343 | B2 | 4/2014 | Nakagawa |

(Continued)

FOREIGN PATENT DOCUMENTS

| | | |
|---|---|---|
| CA | 3092975 A1 | 3/2022 |
| CN | 112532575 A | 3/2021 |
| WO | 2021127577 A1 | 6/2021 |

OTHER PUBLICATIONS

Non-Final Office Action mailed on Aug. 1, 2024, in U.S. Appl. No. 17/820,162, 27 pages.

(Continued)

*Primary Examiner* — Harris C Wang
(74) *Attorney, Agent, or Firm* — Weaver IP L.L.C.

(57) ABSTRACT

Methods, systems and computer program products are provided for granular secure user access to private resources. Increased granularity of security policies for user access may reduce security threats to resources. Security policies indicating user access to secure resources may be based on various combinations of user identities, client-side process (e.g., sub-process) identities, device identities, device types, device locations, resource access types, intelligent access (e.g., selective traffic routing), etc. For example, a security policy may indicate user A, using computing device B executing process C with process signature S (e.g., a signing signature thumbprint, etc.) may access private resource D. A process identity may be indicated by at least one of a process name, a code signing signature, a thumbprint, a process version, or a process publisher. Resource access security policy determinations and/or enforcement may be performed by security clients and/or security engines (e.g., SASE providing ZTNA).

20 Claims, 7 Drawing Sheets

(56) References Cited

U.S. PATENT DOCUMENTS

| | | | |
|---|---|---|---|
| 8,973,088 B1 | 3/2015 | Leung et al. | |
| 9,282,098 B1 | 3/2016 | Hitchcock | |
| 9,866,545 B2 | 1/2018 | Beecham | |
| 9,923,871 B1 | 3/2018 | Chang | |
| 10,075,459 B1 | 9/2018 | Suryanarayanan et al. | |
| 10,084,642 B2 | 9/2018 | Goldfarb | |
| 10,084,794 B2 | 9/2018 | Goldfarb | |
| 10,225,256 B2 | 3/2019 | Gilbert | |
| 10,764,752 B1 | 9/2020 | Avetisov et al. | |
| 11,489,863 B1 | 11/2022 | Shua | |
| 2006/0041761 A1 | 2/2006 | Neumann | |
| 2010/0107237 A1 | 4/2010 | Kitamura | |
| 2012/0102169 A1* | 4/2012 | Yu | H04L 63/1425 |
| | | | 709/223 |
| 2012/0159578 A1 | 6/2012 | Deepak et al. | |
| 2015/0200969 A1 | 7/2015 | Leung et al. | |
| 2017/0034168 A1 | 2/2017 | Wilson et al. | |
| 2017/0230180 A1* | 8/2017 | Benedict | H04L 63/0876 |
| 2017/0235614 A1* | 8/2017 | Choe | G06F 9/5044 |
| | | | 718/104 |
| 2017/0250987 A1 | 8/2017 | Gilbert | |
| 2017/0346804 A1 | 11/2017 | Beecham | |
| 2018/0349625 A1* | 12/2018 | Ikram | H04L 63/10 |
| 2018/0375761 A1 | 12/2018 | Ellis | |
| 2019/0057208 A1 | 2/2019 | Cannariato | |
| 2019/0243985 A1* | 8/2019 | Goodridge | G06F 21/45 |
| 2020/0052889 A1 | 2/2020 | Bendersky | |
| 2020/0145405 A1 | 5/2020 | Bosch | |
| 2020/0204534 A1 | 6/2020 | Beecham | |
| 2020/0285752 A1 | 9/2020 | Wyatt et al. | |
| 2021/0021605 A1 | 1/2021 | Innes | |
| 2021/0044976 A1* | 2/2021 | Avetisov | H04W 12/08 |
| 2021/0336934 A1 | 10/2021 | Pooja et al. | |
| 2022/0103594 A1 | 3/2022 | Galloway | |
| 2022/0286428 A1 | 9/2022 | Howe | |
| 2022/0286429 A1 | 9/2022 | Howe | |
| 2022/0286854 A1 | 9/2022 | Howe | |
| 2022/0286894 A1 | 9/2022 | Howe | |
| 2022/0408255 A1 | 12/2022 | Howe | |
| 2023/0188505 A1* | 6/2023 | Jensen | H04L 63/107 |
| | | | 726/14 |
| 2023/0247003 A1 | 8/2023 | Chanak | |
| 2023/0283608 A1 | 9/2023 | Bosch et al. | |
| 2023/0401134 A1* | 12/2023 | Gupta | G06F 9/5027 |
| 2023/0422086 A1 | 12/2023 | Sridhar | |
| 2024/0064138 A1* | 2/2024 | Jain | H04L 63/0815 |
| 2024/0064147 A1* | 2/2024 | Jain | H04L 63/08 |

OTHER PUBLICATIONS

International Search Report and Written Opinion received for PCT Application No. PCT/US23/027580, Feb. 2, 2024, 14 pages.

U.S. Appl. No. 17/820,162, filed Aug. 16, 2022.

Notice of Allowance mailed on Jul. 8, 2025, in U.S. Appl. No. 17/820,162, 15 pages.

Notice of Allowance mailed on May 27, 2025, in U.S. Appl. No. 17/820,162 19 pages.

Notice of Allowance mailed on Mar. 28, 2025, in U.S. Appl. No. 17/820,162, 25 pages.

"International Search Report and Written Opinion Issued in PCT Application No. PCT/US23/027193", Mailed Date: Oct. 23, 2023, 11 Pages.

Notice of Allowance mailed on Oct. 15, 2025, in U.S. Appl. No. 17/820,162, 11 pages.

* cited by examiner

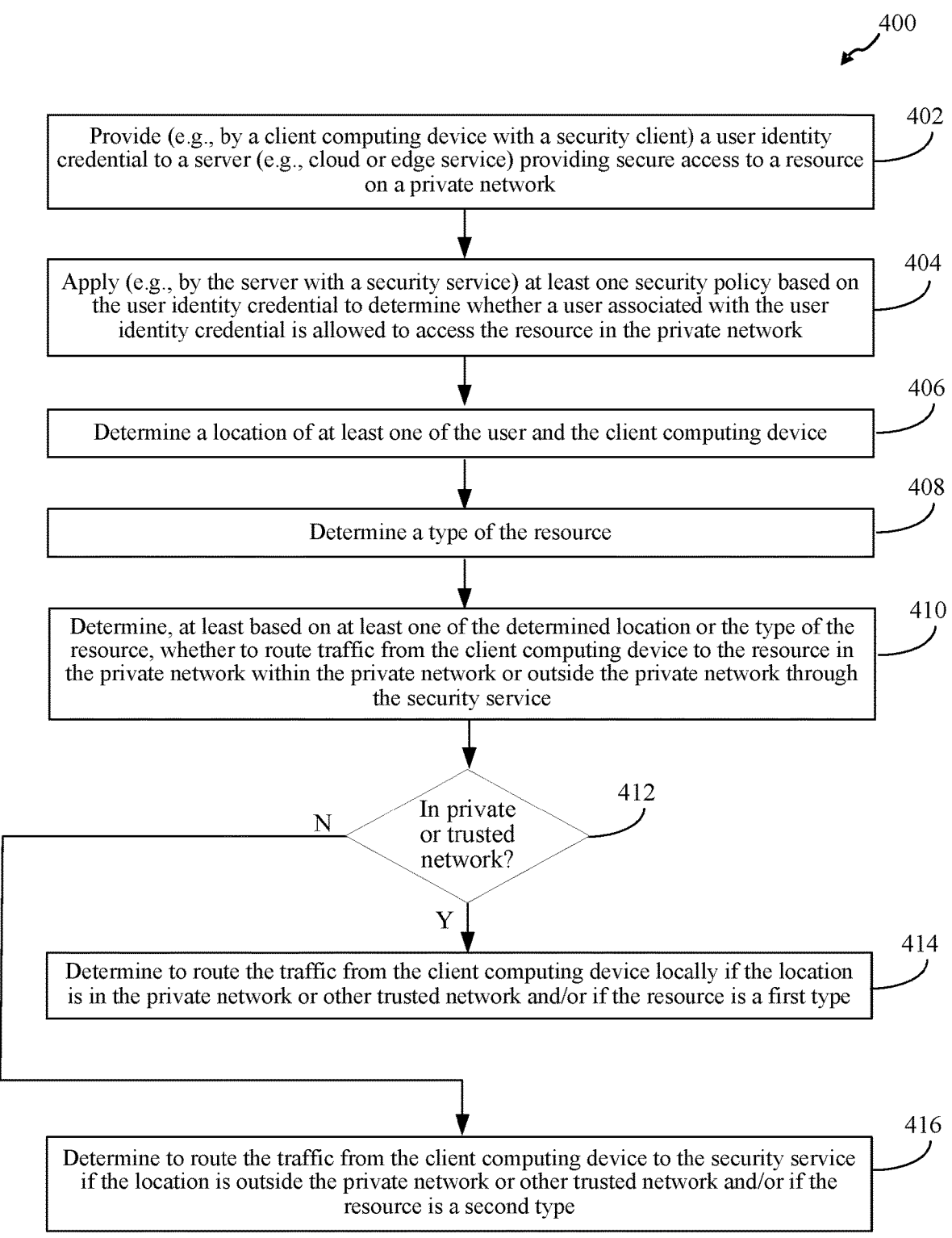

400

Provide (e.g., by a client computing device with a security client) a user identity credential to a server (e.g., cloud or edge service) providing secure access to a resource on a private network

402

Apply (e.g., by the server with a security service) at least one security policy based on the user identity credential to determine whether a user associated with the user identity credential is allowed to access the resource in the private network

404

Determine a location of at least one of the user and the client computing device

406

Determine a type of the resource

408

Determine, at least based on at least one of the determined location or the type of the resource, whether to route traffic from the client computing device to the resource in the private network within the private network or outside the private network through the security service

410

In private or trusted network?

412

N

Determine to route the traffic from the client computing device locally if the location is in the private network or other trusted network and/or if the resource is a first type

Y

414

Determine to route the traffic from the client computing device to the security service if the location is outside the private network or other trusted network and/or if the resource is a second type

Private Resource Security Policy Menu     500

Private Resource ⊕

| | |
|---|---|
| Indicate name(s) of private resource(s) (e.g., application(s)) | 502 |
| Indicate resource type(s) (e.g., Web app) | 504 |
| Indicate resource source(s) (e.g., IP address, IP range, IP prefix, FQDN, domain name) | 506 |

Access Mangement ⊕

| | |
|---|---|
| Indicate whether client access is managed or unmanaged | 508 |
| Indicate connector group(s) (e.g., default – North America) | 510 |
| Indicate access type(s) (e.g., local/on-premises, remote/off-premises, proxy) | 512 |
| Indicate conditions for intelligent access/traffic routing to resource(s) | 514 |
| Indicate whether access is based on user identity and/or process identity | 516 |

User Identity ⊕

| | |
|---|---|
| Indicate User(s) or User Group(s) allowed to access resource(s) | 518 |

Process Identity ⊕

| | |
|---|---|
| Indicate client-side process (e.g., subprocess) name(s) allowed to access resource(s) | 520 |
| Indicate process signature(s) (e.g., hash or signing certificate thumbprint) | 522 |
| Indicate process version(s) | 524 |
| Indicate process publisher(s) | 526 |

Port Range ⊕

| | |
|---|---|
| Indicate TCP or UDP port | 528 |
| Indicate range(s) | 530 |

FIG. 5

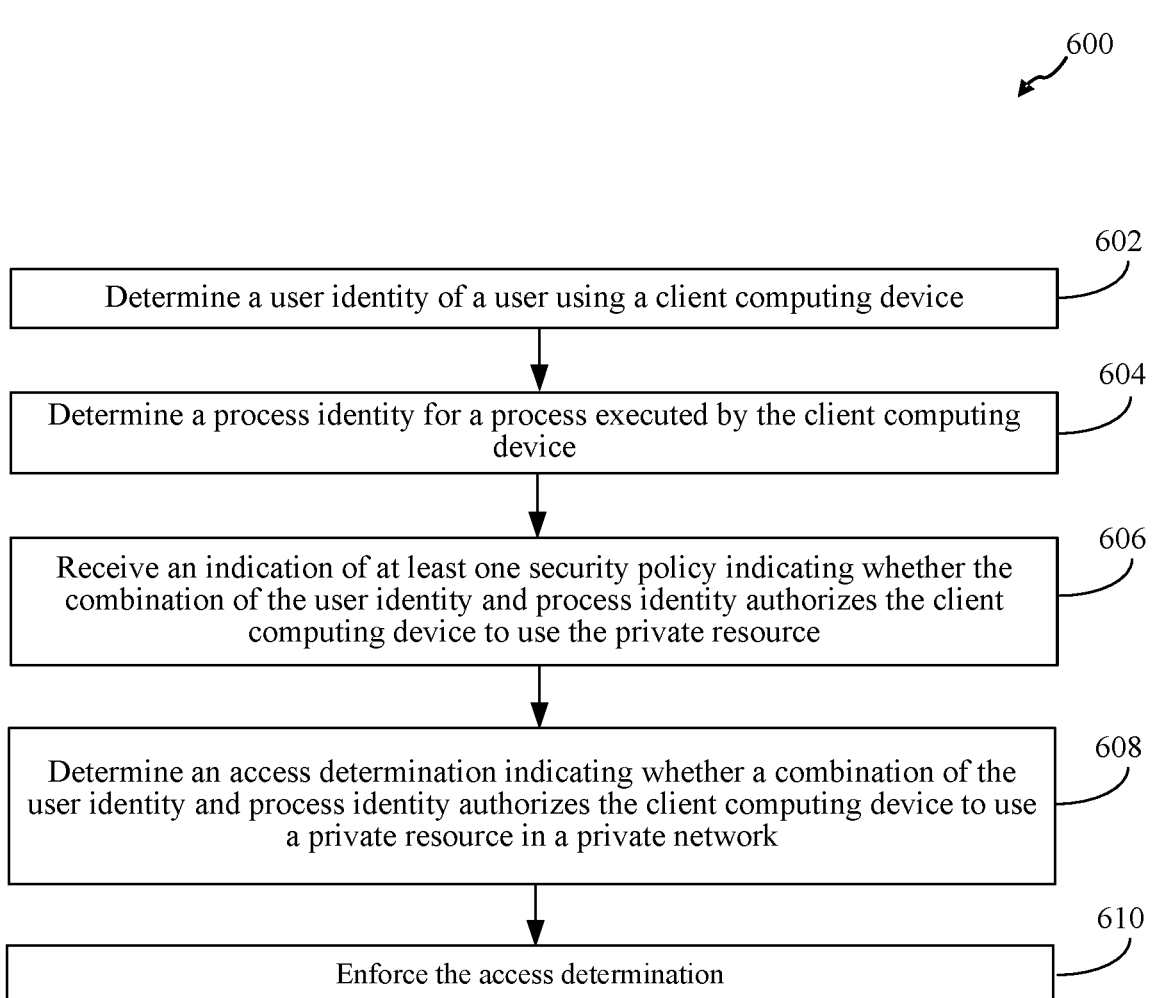

600

602
Determine a user identity of a user using a client computing device

604
Determine a process identity for a process executed by the client computing device 606
Receive an indication of at least one security policy indicating whether the combination of the user identity and process identity authorizes the client computing device to use the private resource 608
Determine an access determination indicating whether a combination of the user identity and process identity authorizes the client computing device to use a private resource in a private network 610
Enforce the access determination

FIG. 6

GRANULAR SECURE USER ACCESS TO PRIVATE RESOURCES

BACKGROUND

Large employee workforces work remotely. Employees access various local and remote (e.g., cloud) company resources directly from the Internet, through a corporate network (e.g., via a virtual private network (VPN) connection), or from computing devices within the corporate network. Remote company resources may include services and applications available through Infrastructure as a Service (IaaS), platform as a service (PaaS), business software as a service (SaaS), Security as a service (SECaaS) or consumer SaaS. Large numbers of users accessing cloud resources may strain network capacity and security stamps. Employees may access company resources in branch offices, for example, via a wide area network (WAN) connecting corporate headquarters to branch offices, which may allow compromised users/devices (e.g., attackers) to move laterally through corporate networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for granular secure user access to private resources. Increased granularity of security policies for user access enables reduced security threats to resources. Security policies indicating user access to secure resources are based on various combinations of features such as user identities, client-side process identities, device identities, device types, device locations, resource access types, intelligent access, etc. Resource access security policy determinations and/or enforcement are performed by security clients and/or servers providing a security service, such as security engines.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 shows a flowchart of an example method for intelligent local access for zero trust network access to private resources, according to an embodiment.

FIG. 5 shows an example of a graphical user interface for granular secure access to private resources, according to an embodiment.

FIG. 6 shows a flowchart of an example method for granular secure access to private resources, according to an embodiment.

Figure 1:
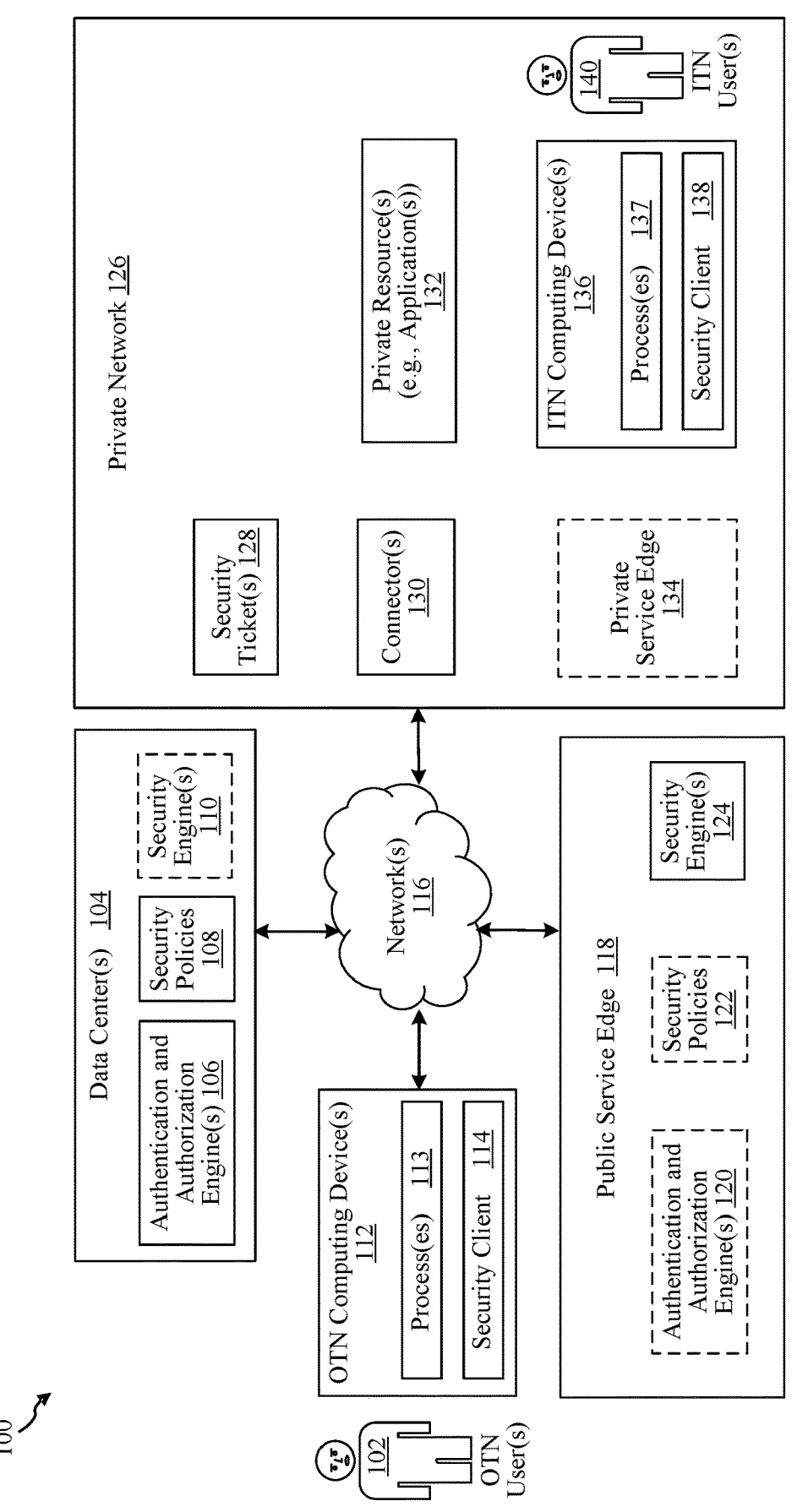
FIG. 1 shows a block diagram of an example computing environment for intelligent local access for zero trust network access to private resources, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Methods, systems and computer program products are provided for granular secure user access to private resources. Increased granularity of security policies for user access reduce security threats to resources. Security policies indicating user access to secure resources may be based on various combinations of user identities, client-side process (e.g., sub-process) identities, device identities, device types, device locations, resource access types, intelligent access (e.g., selective traffic routing), etc. For example, a security policy may indicate user A, using computing device B executing process C with process signature S (e.g., a signing signature thumbprint, etc.) may access private resource D. A process identity may be indicated by at least one of a process name, a code signing signature, a thumbprint, a process version, or a process publisher. Resource access security policy determinations and/or enforcement are performed by security clients and/or security engines (e.g., SASE providing ZTNA).

Large employee workforces work remotely. Employees access various local and remote (e.g., cloud) company resources directly from the Internet, through a corporate network (e.g., via a virtual private network (VPN) connection), or from computing devices within the corporate network. Remote company resources may include services and applications available through Infrastructure as a Service (IaaS), platform as a service (PaaS), business software as a service (SaaS), Security as a service (SECaaS), or consumer SaaS. Large numbers of users accessing cloud resources may strain network capacity and security stamps. Employees may access company resources in branch offices, for example, via a wide area network (WAN) connecting corporate headquarters to branch offices, which may allow compromised users/devices (e.g., attackers) to move laterally through corporate networks.

Company network IT (information technology) administrators may be unable to monitor viruses and malware when employees access the Internet from outside a company network. Admin may be unable to determine compromised employee computing devices that may be used to access company resources. A compromised computing device may be used to get into company headquarters and expand an attack to other resources in the network, e.g., via e-mail servers, financial applications, servers hosting the IP of the company, etc.

A public service edge, such as a secure access service edge (SASE), may be implemented to improve security for local and remote access to public and private resources. A SASE may be implemented as a set of security services enabling network access. A SASE may be used to provide Network as a Service (NaaS) and/or SaaS for a managed cloud service. A SASE security layer may broker connectivity to one or more resources (e.g., IaaS/PaaS such as Microsoft Azure® or Amazon Web Services (AWS), business SaaS applications such as Office 365®, consumer SaaS applications such as Facebook®), regardless whether the access is by remote workers, remote operations (e.g., from branch offices), or access from within a company network.

A SASE may be implemented with ZTNA. ZTNA enables users to securely access private resources when users are working off-premises (e.g., remote). On-premises users accessing the private resources may be provided with high performance access and the same security posture as off-premises users. ZTNA enables secure private access by providing application segmentation. Application segmentation provides for protection against attacks due to lateral movement and provides for per-application policies based on identity. In an example implementation of zero trust based access from users to private applications, user access granularity may be provided at the level of an endpoint represented by an internet protocol (IP) address or a fully qualified domain name (FQDN) port pair. ZTNA may be less expensive, easier to manage, scalable with high performance, for example, compared to on premises infrastructure providing a local proxy to authenticate and route traffic.

In comparison, a VPN may provide direct access to a private network while ZTNA may broker connections more securely to specific private applications in a private network. ZTNA may be implemented with several principles. For example, ZTNA may be implemented to provide a user with the least privilege. In an example, a user may attempt to connect to an application. ZTNA may connect the user (e.g., if authenticated and authorized) to the application, rather than to an entire network. ZTNA may be implemented with explicit verification to an application, a network, etc., implying or assuming no (zero) trust of a user. ZTNA may be implemented with an assumption that the access is a breach or attack that must be contained. For example, an employee's computing device (e.g., machine) may get hacked or otherwise attacked. The attacker may use the machine to move into the company network. Accordingly, under an assumption that an access is an attack, access may be limited or restricted. By analogy, a key may be provided to access a single room, rather than an entire floor or building. ZTNA may be implemented to assume that a key to a room may be used on another room mistakenly or purposefully, blocking such usage.

Authentication is a process of proving that a user or service is legitimate. Authentication may challenge a party (e.g., a user or service) for legitimate credentials (e.g. username and secret, such as a password), for example, as a basis to create a security principal used for identity and access control. Authorization is the act of granting an authenticated security principal permission to do something. Authorization may specify what data a party (e.g. user or service) is allowed to access and what the party can do with it.

Authentication information (e.g., credentials) provided by a user may comprise any information that may be used to verify user identity. Credential categories may be generalized as something a user knows (e.g. answers to one or more prompts or questions, such as a username, a password, and so on), something a user has (e.g. a device that receives a one-time code (OTC), a device storing a cryptographic key and so on) or something a user is (e.g. biometric information, such as retina scan, face scan, fingerprint and so on). Multi-factor authentication (MFA) may combine multiple types of credentials. A username may comprise any string of characters, images (e.g. pattern with coded data) or blob of information. In an example, a username may comprise a random string of characters, a cellular telephone number, an email address and so on. A password may comprise any string of characters and/or images (e.g. pattern with coded data). In an example, a password may comprise a one-time code (OTC), automatically sent during a login procedure to ensure that the entity logging in controls a device or account, such as a computing device or account address that may be specified during the creation of a user identity.

ZTNA may be implemented with one or more ZTNA servers and ZTNA clients. Security policies to access resources (e.g., applications, network) may be set on a security server (e.g., ZTNA server) providing a security service (e.g., a security engine). A ZTNA security service/ engine may have a managed client layer that provides network security and access based on security policies. Security policies may indicate, for example, identity based access to private networks and applications, private application discovery, allowed traffic (e.g., what kind of traffic should go through a managed client layer for a customer's resources), etc. A managed client layer may implement default or customer-specified security policies. A managed client layer may provide threat intelligence, perform deep packet inspection DPS), traffic filtering, transport layer security (TLS) termination and inspection, cloud access security (e.g., data loss/information protection), a world wide web application firewall, and so on. A managed client layer may implemented as a cloud service providing NaaS and SaaS to one or more customers, which may be individuals, businesses, government entities, etc.

Security policies for access/connection to private networks and/or applications may be managed (e.g., through a user interface provided by a ZTNA server) by administrators (admins) for one or more resources accessed through the managed client layer. For example, an admin for company A may set security policy for access to the resources of company A through the managed client layer, an admin for company B may set security policy for access to the resources of company B through the managed client layer, and so on for access to resources owned, leased, etc. by customers.

A customer's private network may be a combination of multiple networks. A customer's private network may have applications on premises and/or applications in the cloud. Some applications may be in one or more clouds (e.g., with different service operators, such as Microsoft, Google and Amazon).

For example, a managed client layer may, based on respective security policies, control access/connection to private networks and/or applications on one or more clouds (e.g., Microsoft Azure, Amazon Web Services (AWS), Google Cloud) and/or one or more private on-premises (e.g., corporate) networks and/or applications (e.g., Web applications, remote server authentication access, such as remote desktop protocol (RDP) or secure shell (SSH) applications, transfer protocols, such as server message block (SMB) or file transfer protocol (FTP) applications, enterprise applications such as Systems, Applications and Products (SAP) or PeopleSoft applications, printing, etc.).

A managed client layer may operate at the edge of a cloud service, e.g., wherever the cloud service may be accessible. The managed client layer may include one or more security engines, data traffic filtering, application of security policies to allowable traffic, etc. One or more security engines running in the managed client layer may enforce security policies, such as user authentication and user authorization for access to resources, traffic filtering, traffic routing, etc. Traffic from authenticated and authorized users and/or computing devices may be provided to a private network and/or application after the traffic is cleared.

A connection may be established between the managed client layer and a managed service (e.g., an application) that a user/computing device is permitted to access. For example, connectors or agents may create an outbound connection from an application to the managed client layer. Connectors may be deployed in various networks with applications users can access through the managed client layer. Private access may piggyback on the outbound connection. For example, a flow may be established in the outbound connection for each application the user is authorized to and does access. A flow may encapsulate traffic in a tunnel. A connection may have multiple flows. Each flow may limit access to a respective resource (e.g., controlled access similar to a key limiting access to a specific room rather than a key to all rooms in an entire floor or building). Connectors may forward incoming traffic to intended applications.

User computing devices may execute a client application. The client application may transform user computing devices into managed clients, e.g., for access to private resources, such as those of an employer. A user device may be referred to as a ZTNA client. A ZTNA client application running on a computing device may receive security policies from a ZTNA server. A ZTNA client may route traffic from a computing device to the managed client layer (e.g., in a cloud service) based on the security policies. A security policy may indicate, for example, where the ZTNA client should route traffic for an attempt to use a private application or network. A security policy may indicate that a user and/or a device must first authenticate, e.g., by entering credentials for analysis and approval by the managed client layer. In an example, conditional access to managed services (e.g., networks, applications) based on security policies in a managed client layer may be implemented by Microsoft Azure Active Directory (AAD).

A connection between a ZTNA client and the managed client layer (e.g., at a cloud computing edge) may be established for authenticated and authorized users/computing devices. A flow may be established in the connection for each network and/or application the user accesses. A connection may have multiple flows. Each flow may limit access to a respective resource (e.g., controlled access similar to a key limiting access to a specific room rather than a key to all rooms in an entire floor or building).

Embodiments may be implemented in a variety of systems/environments. For instance, FIG. 1 shows a block diagram of an example computing environment 100 for intelligent local access for zero trust network access to private resources, according to an embodiment. Other examples of intelligent local access for zero trust network access to private resources may be implemented.

As shown in FIG. 1, computing environment 100 may include a private network 126, one or more computing devices 112, which may be used by users outside a private or other trusted network (OTN user(s)), one or more computing device 136, which may be used by users in a private or other trusted network (ITN user(s)) 140, a public service edge 118, a private service edge 134, one or more data centers 104, and one or more networks 116. Example computing environment 100 presents one of many possible examples of computing environments. Example computing environment 100 may comprise any number of computing devices and/or servers, such as the example components illustrated in FIG. 1 and other additional or alternative devices not expressly illustrated.

Network(s) 116 may include one or more public access and/or restricted access networks. Network(s) 116 may include, for example, one or more of any of a local area network (LAN), a wide area network (WAN), a personal area network (PAN), a combination of communication networks, such as the Internet, and/or a virtual network. In example implementations, computing device(s) 112, data center(s) 104, public service edge 118, and private network, private service edge 134, and ITN computing device(s) 136 may be communicatively coupled via network(s) 116. In an implementation, any one or more of computing device(s) 112, data center(s) 104, public service edge 118, and private network, private service edge 134, and ITN computing device(s) 136 may communicate via one or more application programming interfaces (APIs), and/or according to other interfaces and/or techniques. computing device(s) 112, data center(s) 104, public service edge 118, and private network, private service edge 134, and ITN computing device(s) 136 may include one or more network interfaces that enable communications between devices. Examples of such a network interface, wired or wireless, may include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Public service edge 118 and/or data center(s) 104 may (e.g., each) include one or more computing devices, servers, services, local processes, remote machines, web services, etc. to provide one or more cloud and/or edge-of-cloud based services to customers, such as cloud computing resources, NaaS, and/or SaaS (e.g., security service, such as user identity authentication, authorization, conditional access). Public service edge 118 and/or data center(s) 104 may provide a managed client layer, e.g., as described herein, for OTN computing device(s) 112 and/or ITN computing device(s) 136. For example, a company with a private network may be a customer of a cloud/edge service provider of SaaS and/or NaaS. The company's workforce may include OTN user(s) 102 and ITN user(s) 140. Data center(s) 104 (e.g., in the cloud) and public service edge 118 (e.g., at the edge of the cloud) may include, for example, one or more authentication and authorization engines 106, 120, respectively, security policies 102, 122, respectively, and/or one or more security engines 110, 124, respectively. Dashed boxes in FIG. 1 shows examples of components that may or may not be implemented in various examples, such as for component redundancy and load balancing.

In some examples, authentication and authorization engine(s)/service(s) 120 may be implemented in the edge (e.g., private and/or public service edge 118, 114), for example, along with the security engine(s) (e.g., ZTNA engine) 124. In some examples, components running in the edge may (e.g., also) be running in the data centers to provide redundancy when one or the other is overloaded or offline. In an example, public service edge 118 may include security engine(s)/service(s) 124 (e.g., SASE ZTNA) and may or may not include authentication and authorization engine(s) 120 and security policies 122. In an example, data center(s) 104 may include authentication and authorization engine(s) 106 and security policies 108 and may or may not include security engine(s) 110.

Authentication and authorization engine(s) 120, 106 (e.g., or as implemented in private service edge 134) may be an identity platform (IdP), such as Microsoft Azure Active Directory (AAD). The identity of OTN user(s) 102 may be authenticated, for example, based on login credentials. Authorization to access private resource(s) 132 may be granted or denied, for example, based on security policies 108, 122. A security ticket (e.g., security ticket(s) 128 may be issued for an authenticated user authorized to access private resource(s) 132.

Public service edge 118 or data server(s) 104 may be or may include a tunnel server, such as a remote procedure call (RPC) server. A tunnel server may interface with security client 114, for example, via a data channel and a control channel. A tunnel server may communicate with security engine(s) 110, 124, for example, using transmission control protocol (TCP). A tunnel server may be an open-source RPC server providing a scalable application programming interface (API). A tunnel server may provide traffic received from security client 114 in OTN computing device(s) 112 to security engine(s) 110, 124 (e.g., ZTNA engine). Security engine(s) 110, 124 may analyze the traffic packets and apply security policies 108, 122 to the traffic. For example, security engine(s) 110, 124 may check the certificate of the request, headers, IP address (e.g., determine whether it is a trusted IP), tenant, malware, intrusion, etc. If the traffic is OK, security engine(s) 110, 124 may send the packets to the connector(s) 130. In some examples, a tunnel may be implemented between security engine(s) 110, 124 and connector(s) 130. In some examples, a tunnel path (e.g., RPC) path from the tunnel server may be through one or more data centers to an on-premises connector (e.g., connector(s) 130). In an example, the tunnel path may be from security engine(s) 110, 124 to an application proxy service in a data center to a connector (e.g., connector(s) 130) communicatively coupled to an on-premises application (e.g. private resource(s) 132) in private network 126.

Private network 126 may be a network with restricted access protected by a security system to allow authorized access and deny unauthorized access to private network 126 and/or to private resource(s) 132. Private resource(s) 132 may be any type of resource, e.g., private resources in a cloud service, information/data, applications/programs, etc., as described herein. Private network 126 may be, for example, a cloud service, an enterprise network, or other network. Secure access to private network 126 may be provided by a cloud service/cloud edge service. For example, a security system for private network may be provided by one or more of public service edge 118 outside private network 126, private service edge 134 inside private network 126, and/or data center(s) 104 outside private network 126. The security system may issue security ticket(s) 128 to authenticated, authorized, and/or conditional use users (e.g., OTN user(s) 102 and ITN user(s) 140). Security ticket(s) 128 may be associated with connector(s) 130, for example, to manage access to and to secure connection(s) with private resource(s) 132.

Private service edge 134 may be a private implementation of public service edge 118, for example, with the same or similar components (e.g., authentication and authorization engine(s), security policies, and/or security engine(s)). Private service edge 134 may be managed by public service edge 118, e.g., to provide a common security posture for OTN user(s) 102 and ITN user(s) 140. Private service edge 134 may maintain uniform security while providing more efficient network routing for ITN computing device(s) 136. Traffic from ITN computing device(s) 136 may be routed through private service edge 134 to connector(s) 130 to private resource(s) 132 without going to and through public service edge 118 or data center(s) 104. For example, local traffic from ITN user(s) 140 may be routed locally through private service edge 134 within private network 126 to connector(s) 130 to private resource(s) 132.

In some examples, public service edge 118 or data center(s) 104 (e.g., which may provide security redundancy) may be used to provide private network access security for OTN user(s) 102 (e.g., users working from home) and ITN user(s) 140 (e.g., users working in the office where private network 126 is located or in a satellite office). In some examples, private service edge 134 may (e.g., alternatively and/or additionally) be used to provide security for ITN user(s) 140. Public service edge 118, data center(s) 104 and/or private service edge 134 may issue security tickets 128 for authenticated, authorized OTN user(s) 102 and ITN user(s) 140. Private network 126 may connect private resource(s) 132 to public service edge 118, data center(s) 104 and/or private service edge 134 through connector(s) 130, e.g., as described herein. Connector(s) 130 may forward traffic from public service edge 118, data center(s) 104 and/or private service edge 134 to private resource(s) 132. Public service edge 118, data center(s) 104 and/or private service edge 134 may connect to and perform traffic routing from/to OTN computing device(s) 112 and/or ITN computing device(s) 136 with access to private resource(s) 132.

Private service edge 134 may be implemented to improve network routing efficiency for on-premises users, e.g., at a cost of hardware, software, set up, and maintenance. Private service edge software may be installed on one or more on-premises servers (e.g., in private network 126). Private service edge software may permit private service edge 134 to be managed by public service edge 118, which may be off-premises in or at the edge of the cloud. A private service edge utilizes one or more servers that involve set up, management, etc., from network administrators. In some examples, a separate security model may be implemented for on-premises access (e.g., in lieu of a private service edge), but may also involve hardware (e.g., servers), admin set-up, management, etc., resulting in a non-uniform security posture for OTN user(s) 102 and ITN user(s) 140.

OTN computing device(s) 112 and ITN computing devices 136 may comprise computing devices utilized by one or more customers (e.g., individual users, family users, enterprise users, governmental users, administrators, etc.) generally referenced as OTN user(s) 102 and ITN user(s) 140. OTN computing device(s) 112 and ITN computing devices 136 may comprise one or more applications, operating systems, virtual machines (VMs), storage devices, etc. that may be executed, hosted, and/or stored therein or via one or more other computing devices via network(s) 116. In an example, OTN computing device(s) 112 and ITN computing devices 136 may access one or more other devices (e.g., via network(s) 116), such as data center(s) 104, public service edge 118, private network 126, private service edge 134, etc., to request service (e.g., in a service request (SR)) and/or to provide information, for example, for user identity authentication, authorization, ongoing conditional access to private resource(s) 132.

Figure 7:
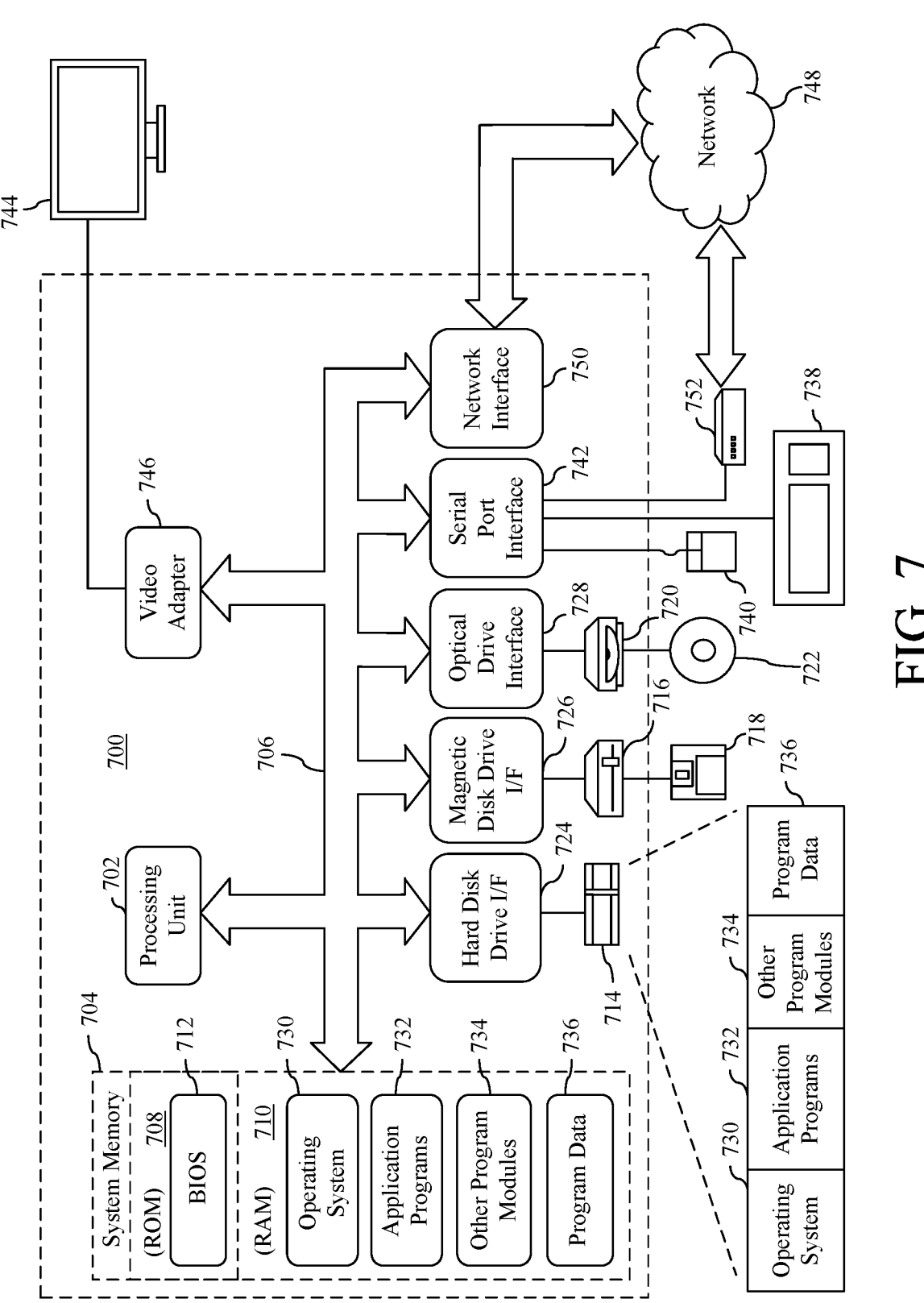
FIG. 7 shows a block diagram of an example computing device that may be used to implement example embodiments.

OTN computing device(s) 112 and ITN computing devices 136 may represent any number of computing devices and any number and type of groups (e.g., various users among multiple cloud service tenants). OTN user(s) 102 and ITN user(s) 140 may represent any number of persons, who may or may not be authorized to access one or more private resources 132. TN computing device(s) 112 and ITN computing devices 136 may each be may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device(s) 104 are not limited to physical machines, but may include other types of machines or nodes, such as a virtual machine. An example of OTN computing device(s) 112 and ITN computing devices 136 is shown in FIG. 7.

In some examples, OTN computing device(s) 112 and ITN computing devices 136 may represent the same (e.g., portable) computing device(s) in different locations, e.g., inside private network 126 or other trusted network and outside private network 126 or other trusted network. In some examples, OTN user(s) 102 and ITN user(s) 140 may represent the same user(s) in different locations, e.g., inside private network 126 or other trusted network and outside private network 126 or other trusted network. For example, a user may user a portable computing device inside and outside private network 126.

OTN computing device(s) 112 and ITN computing devices 136 may (e.g., each) execute one or more processes. A process is an instance of an executable program. For example, OTN computing device(s) 112 may execute one or more processes 113 and ITN computing device(s) 136 may execute one or more processes 137. One or more process(es) 113, 137 may be instances of one or more applications/programs used to (e.g., attempt to) access private network 126 and/or private resource(s) 132. In some examples, processes 113, 137 may be the same process, such as when a user uses a portable computing device inside and outside private network 126.

OTN computing device(s) 112 and ITN computing devices 136 may (e.g., each) execute a security client. For example, OTN computing device(s) 112 may execute security client 114 and ITN computing device(s) 136 may execute security client 138. Security clients 114, 138 may each be, for example, a SASE ZTNA client. In some examples, security clients 114, 138 may be the same security client, such as when a user uses a portable computing device inside and outside private network 126. Security clients 114, 138 may be clients of security engine(s) 124 (e.g., SASE ZTNA engine(s)).

In some examples, a user (e.g., OTN user(s) 102 and/or ITN user(s) 140) may use a browser running as process(es) 113, 137 on a computing device (e.g., OTN computing device(s) 112 and/or ITN computing devices 136) to try to access a private application (e.g., private resource(s) 132). For example, process(es) 113, 137 may comprise a Web browser attempting to load a private application 132 as a Web application. In some examples, security client 114, 138 may comprise an NaaS client with network interception, e.g., to intercept network requests. An example of an NaaS client is a ZTNA client. ZTNA, NaaS and SaaS may be used interchangeably. A component of a ZTNA client may include a lightweight filter (LWF) driver. In examples, a network driver interface specification (NDIS) intermediate (IM) filter driver or a NDIS LWF driver may be used to implement network control or other related functions. The LWF driver may be implemented as a kernel component running on the computing device (e.g., OTN computing device(s) 112 and/or ITN computing devices 136). An LWF driver may be implemented in the networking stack to intercept traffic. For example, a user may type "bing.com" in the browser address bar. A request to bing.com may be intercepted by an LWF component in security client 114, 138. The intercepted request may go through the kernel to the networking stack. Security policies 122 may be applied to the intercepted traffic.

Security client (e.g., ZTNA client) 114, 138 may (e.g., also) include a private access plugin component. The private access plugin may tunnel traffic intercepted/acquired by a network interception component to data center(s) 104, public service edge 118 and/or private service edge 134. Security client 114, 138 (e.g., a private access plugin component) may have one or more control channels to data center(s) 104, public service edge 118 and/or private service edge 134 (e.g., control channel(s) to security engine(s) and/or to authentication and authorization engine(s)).

As described herein, a consistent security posture may be provided for users (e.g., OTN user(s) 102 and ITN user(s) 140) regardless of their location relative to private network 126 or another trusted network, without additional infrastructure, set up, management, etc. On-premises and off-premises users may be provided with the same security posture with intelligent (e.g., variable) routing. Some security measures provided by security engine(s) 110, 124 or in private service edge 134, such as traffic inspection and filtering, may or may not be implemented for local routing, although being located in a trusted network may provide an improved level of security relative to OTN user(s) 102. Security client 138 in ITN computing device(s) 136 may utilize private service edge 134, public service edge 118, and/or data center(s) 104 for authorization, authentication, and/or ongoing conditional access for ITN user(s) 140 while providing intelligent local access to private resource(s) 132. For example, a security service (e.g., secure access service edge (SASE) providing zero trust network access (ZTNA)) (e.g., private service edge 134, public service edge 118, and/or data center(s) 104) may maintain the same or similar security posture for users who work remotely (e.g., off-premises or outside a private network or other trusted network), such as OTN user(s) 102, and/or locally (e.g., on-premises or inside a private network or other trusted network), such as ITN user(s) 140, by providing authentication, authorization, and/or ongoing conditional access via a security service (e.g., private or public SASE) while intelligently routing remote client traffic (e.g., from OTN computing device(s) 112) to private resource(s) 132 through the security service (e.g., private service edge 134, public service edge 118, and/or data center(s) 104) and routing local client traffic (e.g., from ITN computing device(s) 136) to private resource(s) 132 locally. A traffic routing determination may be made by a security client (e.g., security client 114, 138, which may be a ZTNA client) and/or security server (e.g., e.g., security engine(s) 110, 124 or in private service edge 134, which may be ZTNA servers). A traffic routing determination may be based on the location of a client computing device, such as a trusted network detection indicating whether a client computing device (e.g., OTN computing device(s) 112 or ITN computing device(s) 136) is inside or outside private network 126 and/or another trusted network (e.g., implemented with the same or similar security policies and/or service. Traffic routing determinations may be based on one or more conditions alternative or in addition to location, such as the type of private resource being accessed by a client computing device and/or the process(es) 113 involved in attempted access to private resource(s) 132.

In an example system process flow, a location determination (e.g., a trusted network detection) may be performed by security client 114, 138 (e.g., ZTNA client) and/or by private service edge 134, public service edge 118, and/or data center(s) 104. A determination may be made whether the computing device 112, 136 is in private network 136 or other trusted network based on the location determination (e.g., trusted network detection). Security client 114, 138, private service edge 134, public service edge 118, and/or data center(s) 104 may apply security policies 108, 122 (e.g., or security policies in private security edge 134), such as user authentication, authorization, and/or conditional access. Security policies 108, 122 (e.g., or security policies in private security edge 134) may be based on one or more of the following: user identity, location, process(es) 113, 137, the type of private resource(s) 132, etc. Security policies may be user identity-aware, user and/or computing device location-aware, private resource-aware, computing device process-aware, etc. Intelligent traffic routing may be based on one or more security policies.

In an example implementation of network detection, a TND policy may be enabled for location detection. A connector/agent may be deployed on a trusted network (e.g., on-premises, such as in private network 126). A connector/agent may be, for example connector(s) 130. The connector/agent may be configured (e.g., by an administrator) to expose an end-point, e.g., continuously or on command, for example, by exposing an IP internally or configuring a DNS. One or more criteria may be indicated in a TND policy (e.g. making an FQDN available locally, which can be reachable by a security client only while a computing device is in a trusted network). The policy may indicate that the private network enables intelligent local access by security clients in on-premises computing devices. A security client (e.g., security client 114, 138) may be configured to contact/detect the exposed endpoint to determine whether a computing device (e.g., computing device(s) 112, 136) is in a trusted network (e.g., on-premises). In an (e.g., alternative and/or additional) example implementation of network detection, a TND policy may be configured. An endpoint may be set up/configured (e.g., to be used) for TND. For example, a connector agent may (e.g., automatically detect) the trusted network and configure/perform set-up without the involvement of an administrator.

A security client may intelligently (e.g., selectively) route traffic from user computing devices based on one or more of the following: user identity, location, type of process(es) 113, 137, type of private resource(s) 132, etc. For examples, a security client (e.g., security client 138) may intelligently (e.g., selectively) route traffic from ITN computing device(s) 136 to private resource(s) 132 locally (e.g., instead of through the edge/cloud) based on a determination that ITN computing device(s) 136 is(are) located in private network 126 (e.g., or other trusted network), and/or based on user identity-based security, such as authentication, authorization, and/or based on conditional access to private resource(s) 132, and/or based on process(es) 113, 137, and/or based on the type of private resource(s) 132, etc.

A security client (e.g., security client 114) may intelligently (e.g., selectively) route traffic from OTN computing device(s) 112 to private resource(s) 132 through cloud/edge security (e.g., security engine(s) 110, 124), for example, based on a determination that OTN computing device(s) 112 is(are) located outside private network 126 (e.g., and outside other trusted networks), and/or based on user identity-based security, such as authentication, authorization, and/or conditional access to private resource(s) 132, and/or based on process(es) 113, 137, and/or based on the type of private resource(s) 132, etc. Data center(s) 104, public service edge 118, and/or private service edge 134 may provide continuous access evaluation regardless of traffic routing determinations/decisions.

Figure 2:
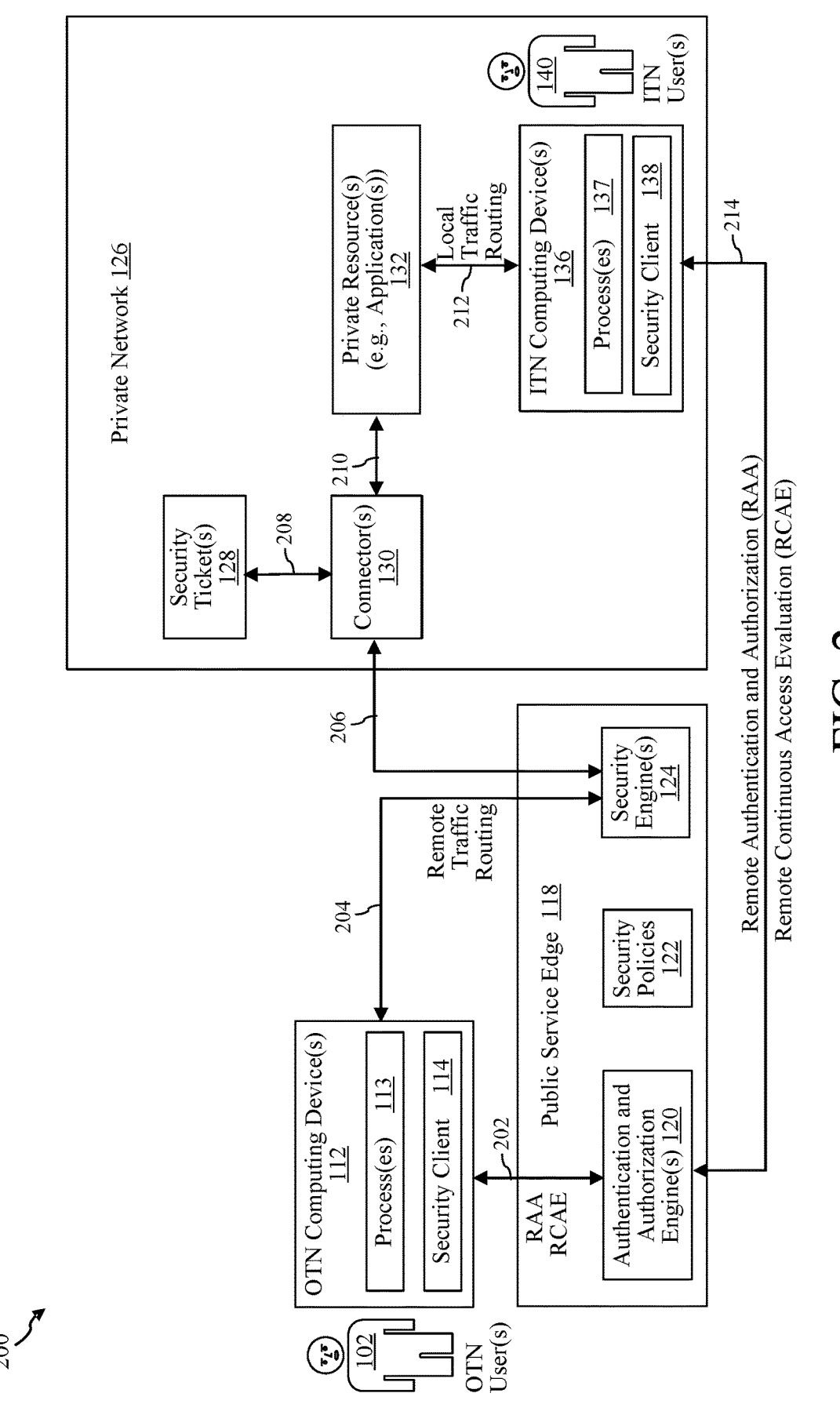
FIG. 2 shows a block diagram of an example of intelligent local access for zero trust network access to private resources with public service edge authentication and authorization, according to an embodiment.
Figure 3:
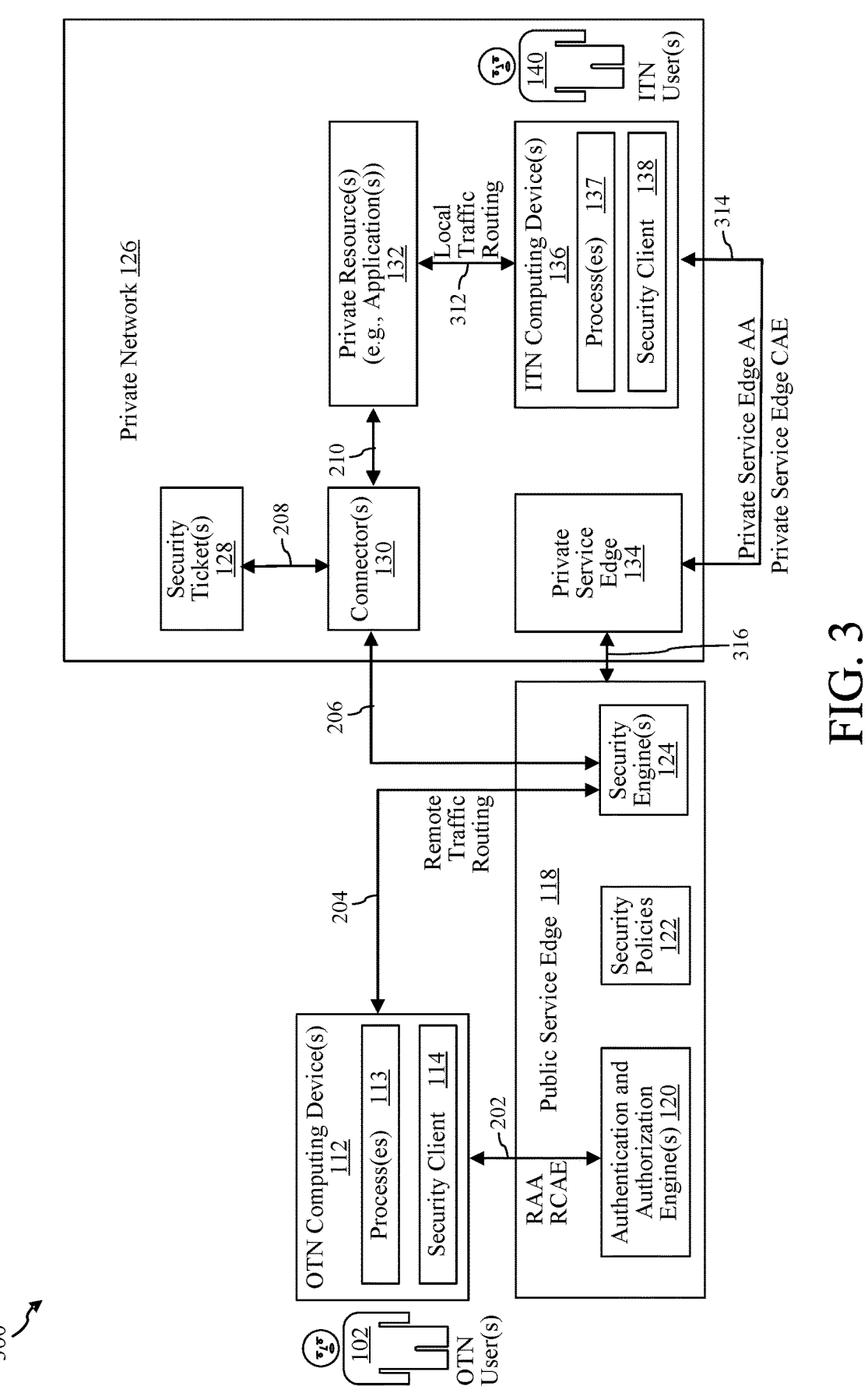
FIG. 3 shows a block diagram of an example of intelligent local access for zero trust network access to private resources with private service edge authentication and authorization, according to an embodiment.

FIGS. 2-4 show examples of intelligent routing based on a location determination alone or in conjunction with one or more other parameters (e.g., user identity type of process(es)

113, 137, type of private resource(s) 132, etc.). Other examples may be implemented in a wide variety of implementations with and without consideration of location of user and/or computing device(s). FIGS. 2-4 show that, following authentication and authorization, unlike computing devices external to the private network or other trusted network, traffic does not have to be tunneled in all cases to a managed client layer in a public service edge. Instead, at least based on one or more conditions or parameters, traffic may be sent by a security client (e.g., ZTNA client) on a computing device locally to a private application.

As shown in FIGS. 1-4, a public or private service edge with a managed client layer may provide authentication (e.g., for a user identity), conditional access, authorization (e.g., access allowed for an authorized user identity), continuous access evaluation (CAE), application segmentation to limit access, traffic security (e.g., inspection, filtering), etc. A public or private service edge may continue to perform CAE and conditional access for an on-premises user/computing device after authentication, authorization and segmented access to applications. Other forms of security, such as endpoint protection, may be implemented in a security client (e.g., ZTNA client) for on-premises users/computing devices that are in a private network. Security implemented for an on-premises computing device may reduce the additional value of one or more types of public service edge security, such as traffic security (e.g., inspection, filtering). Private networks may (e.g., additionally and/or alternatively) inspect traffic leaving and entering a private network, traffic within the network, or via a public or private service edge.

Conditional access security policies for authorized users may be based on various conditions, such as device location, time, IP address, etc. For example, access may be conditioned (e.g., allowed, denied, double-checked such as by multi-factor authentication, restricted) based on one or more detected conditions, such as the location of a computing device that is ostensibly being used by an authorized user (e.g., on-premises or various locations outside a private network, such as in another trusted network, at home, in public, etc.).

Intelligent (e.g., variable, selective or conditional) traffic routing may be determined by a security client and/or a public/private service edge. A security client may enforce the determination. A trusted network detection (TND) may be used (e.g., by a security client) to determine user/computing device location. An administrator may specify security policy criteria used to determine user/device location as being in or out of the private network. A ZTNA client may route traffic (e.g., based on a location determination and/or command by a service edge), for example, in a tunnel to the public/private service edge (e.g., for an authorized user detected to be outside the network) and/or may route traffic locally (e.g., for an authorized user detected to be inside the network/on-premises). Conditional traffic routing may lead to conditional traffic security monitoring, conditional use of connectors, conditional connections between private network and service edge, conditional use of connectors in private network, etc.

Intelligent traffic routing determinations may reside wholly or partially in a security client. A security client may enforce/implement traffic routing determinations. A traffic routing decision based on one or more security policies, such as a client location determination (e.g., based on one or more trusted network detection criteria), may be made in the client or the engine (server). A security engine may provide security policies to a security client to the client. In some examples, the client may share its state with the security engine/server and the server may apply the security policy (ies), determine routing and then direct the client to act on the determination. The server may send the client a (e.g., new) policy, which may be a temporary or session-based policy to implement traffic routing. In some examples, the client may apply security policies (e.g., provided by the server) to the determined state of the client, for example, to determine routing and then enforce the routing determination.

In some examples, a routing determination, e.g., whether to do remote routing (with packet inspection) or local routing (w/o inspection) of client traffic, may be based on one or more security policies, parameters, and/or conditions. A traffic policy evaluation (TPE) may determine client traffic routing (e.g., remote routing or local routing of traffic). TPE may be configured to determine routing based on an evaluation any number of security policies, parameters and/or conditions, such as one or more of the following: identity authentication policies, identity authorization policies, user/device location determination policies, trusted network detection (TND) determination policies, type of application being accessed (e.g., highly confidential application, risky application) based on application classification policies, etc. In some examples, routing may be based on the type of application and/or information expected to be in traffic. For example, accessing a highly confidential application and/or highly confidential information may be routed differently than accessing a common application with common information. A network resource administrator may specify (e.g., set) and manage security policies, for example, in a user interface. Policies may be accumulated in a policy table. For example, an entry in a policy table may indicate specific applications, their IP addresses, routing indications (e.g., bypass-do not tunnel, remote/cloud/edge, or local). A TPE may implement alternative and/or additional logic based on any number of policies, parameters, and/or conditions to determine routing. Additional polices, parameters and/or conditions may include, for example, location in a trusted network, to permit local routing.

FIG. 2 shows a block diagram of an example of intelligent local access for zero trust network access to private resources with public service edge authentication and authorization, according to an example embodiment. For simplicity, FIG. 2 shows FIG. 1 without network(s) 116 and data center(s) 104. Various implementations may be the same, similar to, or different than the example shown in FIG. 2, and may or may not include network(s) 116 and data center(s) 104.

As shown by example in FIG. 2, off-premises computing devices outside a private network (e.g., or other trusted network) may perform intelligent access by sending traffic to a private resource through a public edge in the cloud. For example, security client 114 in OTN computing device(s) 112 may seek remote authentication and authorization (RAA) 202 from public service edge 118. Security client 114 in OTN computing device(s) 112 may seek authentication and/or (e.g., initial, ongoing) application of security policies (e.g., remote continuous access evaluation) RCAE 202) from cloud/edge/off-premises/public server(s) (e.g., public service edge 118) regardless of public/private traffic routing, for example, to provide the same security posture for users accessing private resources locally and remotely while intelligently routing traffic locally if/when warranted. Authentication and authorization engine(s) 120 may authenticate and authorize OTN user(s) 102 to access private resource(s) 132 based on security policies 122. In other examples, authentication and authorization engine(s) 106 in data center(s) 104 may perform authentication, authorization, and/or ongoing conditional access based on security policies 108.

Security client 114 may perform a location detection (e.g., a trusted network detection). Such location determination may be performed by security client 114 in various ways, including by a location indication in profile information, an IP (Internet Protocol) address of security client 114, by GPS (global positioning system), cell tower triangulation, and/or any other suitable location determining technique. Security client 114 may determine that OTN computing device(s) 112 is(are) located outside private network 126 (e.g., and other trusted networks). Security client 114 may intelligently route traffic from process(es) 113 to private resource(s) 132 through public service edge 118 based on the location detection and off-premises determination. For example, traffic from process(es) 113, which may be intercepted by security client 114, may be sent (e.g., via remote traffic routing 204, such as through network(s) 116 and/or data center(s) 104) to security engine(s) 124. Security engine(s) 124 may perform one or more analyses on the traffic (e.g., based on security policies 122) before sending the cleared traffic 206 to connector(s) 130. Connector(s) 130 may (e.g., based on security ticket(s) 128 confirming OTN user(s) 102 access) provide received traffic 210 to private resource(s) 132. Connector(s) 130 may verify access to private resource(s) 132 based on access 208 to (e.g., cached) security ticket(s) 128, which may be generated and provided by security engine(s) 124. The intelligent access (e.g., selectable or variable) traffic routing may be implemented in reverse, for example, for traffic from private resource(s) 132 to process(es) 113.

As shown by example in FIG. 2, on-premises computing devices inside a private network (e.g., or other trusted network) may perform intelligent access by sending traffic to a private resource locally without going through a public edge in the cloud. For example, security client 138 in ITN computing device(s) 136 may seek remote authentication and authorization (RAA) 214 from public service edge 118. Security client 138 in ITN computing device(s) 136 may seek authentication and/or (e.g., initial, ongoing) application of security policies (e.g., RCAE 214) from cloud/edge/off-premises/public server(s) (e.g., public service edge 118) regardless of public/private traffic routing, for example, to provide the same security posture for users accessing private resources locally and remotely while intelligently routing traffic locally if/when warranted. Authentication and authorization engine(s) 120 may authenticate and authorize ITN user(s) 140 to access private resource(s) 132 based on security policies 122. In other examples, authentication and authorization engine(s) 106 in data center(s) 104 may perform authentication, authorization, and/or ongoing conditional access based on security policies 108.

Security client 138 may perform a location detection (e.g., a trusted network detection). Security client 138 may determine that ITN computing device(s) 136 is(are) located inside private network 126 (e.g., or another trusted network). Security client 138 may intelligently route traffic from process(es) 137 to private resource(s) 132 locally based on the location detection and off-premises determination. For example, traffic from process(es) 137, which may be intercepted by security client 138, may be sent locally (e.g., via local traffic routing 212) to private resource(s) 132. The intelligent access (e.g., selectable or variable) traffic routing may be implemented in reverse, for example, for traffic from private resource(s) 132 to process(es) 136.

FIG. 3 shows a block diagram of an example system 300 configured for intelligent local access for zero trust network access to private resources with private service edge authentication and authorization, according to an example embodiment. For simplicity, FIG. 3 shows FIG. 1 without network(s) 116 and data center(s) 104. Various implementations may be the same, similar to, or different than the example shown in FIG. 3, and may or may not include network(s) 116 and data center(s) 104.

As shown by example in FIG. 3, off-premises computing devices outside a private network (e.g., or other trusted network) may perform intelligent access by sending traffic to a private resource through a public edge in the cloud. For example, security client 114 in OTN computing device(s) 112 may seek remote authentication and authorization (RAA) from public service edge 118. Authentication and/or (e.g., initial, ongoing) application of security policies may be performed by cloud/edge/off-premises/public server(s) regardless of public/private traffic routing, for example, to provide the same security posture for users accessing private resources locally and remotely while intelligently routing traffic locally if/when warranted. Authentication and authorization engine(s) 120 may authenticate and authorize OTN user(s) 102 to access private resource(s) 132 based on security policies 122. In other examples, authentication and authorization engine(s) 106 in data center(s) 104 may perform authentication, authorization, and/or ongoing conditional access based on security policies 108.

Security client 114 may perform a location detection (e.g., a trusted network detection). Security client 114 may determine that OTN computing device(s) 112 is(are) located outside private network 126 (e.g., and other trusted networks). Security client 114 may intelligently route traffic from process(es) 113 to private resource(s) 132 through public service edge 118 based on the location detection and off-premises determination. For example, traffic from process(es) 113, which may be intercepted by security client 114, may be sent (e.g., via remote traffic routing 204, such as through network(s) 116 and/or data center(s) 104) to security engine(s) 124. Security engine(s) 124 may perform one or more analyses on the traffic (e.g., based on security policies 122) before sending the cleared traffic 206 to connector(s) 130. Connector(s) 130 may (e.g., based on security ticket(s) 128 confirming OTN user(s) 102 access) provide received traffic 210 to private resource(s) 132. The intelligent access (e.g., selectable or variable) traffic routing may be implemented in reverse, for example, for traffic from private resource(s) 132 to process(es) 113.

As shown by example in FIG. 3, on-premises computing devices inside a private network (e.g., or other trusted network) may perform intelligent access by sending traffic to a private resource locally without going through a public edge in the cloud. For example, security client 138 in ITN computing device(s) 136 may seek remote authentication and authorization (RAA) 314 from private service edge 134. Security client 138 in ITN computing device(s) 136 may seek authentication and/or (e.g., initial, ongoing) application of security policies (e.g., RCAE 214) from private service edge 134, for example, to provide the same security posture for users accessing private resources locally and remotely while intelligently routing traffic locally if/when warranted. An authentication and authorization engine(s) in private service edge 134 may authenticate and authorize ITN user(s) 140 to access private resource(s) 132 based on security policies in private service edge 134.

Security client 138 may perform a location detection (e.g., a trusted network detection). Security client 138 may determine that ITN computing device(s) 136 is(are) located inside private network 126 (e.g., or another trusted network). Security client 138 may intelligently route traffic from process(es) 137 to private resource(s) 132 locally based on the location detection and off-premises determination. For example, traffic from process(es) 137, which may be intercepted by security client 138, may be sent locally (e.g., via local traffic routing 312) to private resource(s) 132. The intelligent access (e.g., selectable or variable) traffic routing may be implemented in reverse, for example, for traffic from private resource(s) 132 to process(es) 136.

FIG. 4 shows a flowchart of an example method 400 for intelligent local access for zero trust network access to private resources, according to an example embodiment. Embodiments disclosed herein and other embodiments may operate in accordance with example method 400. Method 400 comprises steps 402-416. However, other embodiments may operate according to other methods. Other structural and operational embodiments will be apparent to persons skilled in the relevant art(s) based on the foregoing discussion of embodiments. No steps are required unless expressly indicated or inherently required. No order of steps is required unless expressly indicated or inherently required. There is no requirement that a method embodiment implement all of the steps illustrated in FIG. 4. In various implementations, steps may be added, removed, implemented in the alternative, e.g., in any combination or order. FIG. 4 is simply one of many possible embodiments. Embodiments may implement fewer, more or different steps.

As shown in FIG. 4, in step 402, a user identity credential may be provided (e.g., by a client computing device with a security client) to a server (e.g., cloud or edge service) providing secure access to a resource on a private network. For example, as shown in FIG. 2, ITN computing device(s) 136 with security client 138 and OTN computing device(s) 112 with security client 114 may provide user identity credentials for ITN user(s) 140 and OTN user(s) 102 to a server providing public service edge 118, which provides secure access to private resource(s) 132 in private network 126.

As shown in FIG. 4, in step 404, at least one security policy may be applied (e.g., by the server with a security service) based on the user identity credential to determine whether a user associated with the user identity credential is allowed to access the resource in the private network. For example, as shown in FIG. 2, authentication and authorization engine(s) 120 may apply security policies 122 to determine whether ITN user(s) 140 may use process(es) 137 executed by ITN computing device(s) 136 and OTN user(s) 102 may use process(es) 113 executed by OTN computing device(s) 112 to access private resource(s) 132 in private network 126.

As shown by FIG. 4, in step 406, a location of at least one of the user and the client computing device may be determined. For example, as shown in FIG. 2, security client 138 and/or security engine(s) 124 may determine a location of ITN user(s) 140 and/or ITN computing device(s) 136 relative to private network 126 and/or another trusted network and security client 114 and/or security engine(s) 124 may determine a location of OTN user(s) 102 and/or OTN computing device(s) 112 relative to private network 126 and/or another trusted network As shown by FIG. 4, in step 408, a type of the resource may be determined. For example, as shown in FIG. 2, security clients 138, 114 and/or security engine(s) 124 may determine a type of private resource(s) 132.

As shown in FIG. 4, in step 410, a determination may be made (e.g., at least based on at least one of the determined location or the type of the resource), whether to route traffic from the client computing device to the resource in the private network within the private network or outside the private network through the security service. For example, as shown in FIG. 2, security client 138 and/or security engine(s) 124 may determine (e.g., based on at least one of the determined location or the type of the resource), whether to route traffic from ITN computing device(s) 136 to private resource(s) 132 within private network 126 or outside private network 126 through security engine(s) 124. Likewise, security client 114 and/or security engine(s) 124 may determine (e.g., based on at least one of the determined location or the type of the resource), whether to route traffic from OTN computing device(s) 112 to private resource(s) 132 within private network 126 or outside private network 126 through security engine(s) 124.

As shown in FIG. 4, in steps 412-416, a determination may be made to route the traffic from the client computing device locally if the location is in the private network or other trusted network and/or if the resource is a first type, or to route the traffic from the client computing device to the security service if the location is outside the private network or other trusted network and/or if the resource is a second type. For example, as shown in FIG. 2, security client 138 may determine to route traffic from ITN computing device(s) 136 to private resource(s) 132 locally within private network 126 if the location of ITN computing device(s) 136 is in private network 126 or other trusted network and/or if private resource(s) 132 is(are) a first type. Likewise, security client 114 may determine to route traffic from OTN computing device(s) 112 remotely outside private network 126 through security engine(s) 124 if the location of OTN computing device(s) 112 is outside private network 126 and other trusted networks and/or if private resource(s) 132 is(are) a second type.

Application to application (e.g., workload to workload) security is different from user to application security (e.g., client-side to server-side access). Security policies 108, 122, which may (e.g., also) be present on OTN computing device(s) 112, ITN computing device(s) 136, and/or private service edge 134, may be used to implement user to application security (e.g., client-side to server-side access).

Private network/resource administrators (admins) may create and manage security policies 108, 122, etc., for example, using a graphical user interface (GUI) provided by public service edge 118, data center(s) 104, private service edge 134, security client 114, 138, etc. An admin may specify access granted and/or denied to various private resources. A security policy may segment one or more resources (e.g., applications) from a network, which may be referred to as resource/application segmentation. Application segmentation (e.g., in ZTNA) may grant a user access to an application rather than access to a (e.g., full) network. Application segmentation is not process-specific. A variety of processes, such as different browser processes (e.g., Microsoft Edge®, developed by Microsoft Corp. of Redmond, Washington, Mozilla Firefox®, developed by Mozilla Corp. of Mountain View, California, Safari®, developed by Apple Inc. of Cupertino, California, and Google® Chrome of Mountain View, California, etc.), or any other application executed by a computing device, may be used to access a private resource (e.g., an application). For example, security client 114 in OTN computing device(s) 112 may (e.g., based on user identity authentication and authorization) send traffic from any of a variety of processes 113 executed by OTN computing device(s) 112 via a tunnel to security engine(s) 124 in public service edge 118, which may (e.g., after checking the traffic) forward it to connector(s) 130, which may forward the traffic to private resource(s) 132.

The granularity of secure access to private resource(s) 132 may be improved (e.g., by alternative and/or additional segmentation). For example, an admin may specify (e.g., create, manage, control, restrict, etc.) access security policies (e.g., or lack thereof) for private network 126 and/or private resource(s) 132 based on one or more of the following: user identities, user/client-side device identity, user/client device location, client-side process identities, client device type, access type (e.g., based on client device location), date(s), time(s), intelligent routing (e.g., selective traffic routing), connector groups, port ranges, etc.

An advantage/benefit of improving the granularity of security may be a reduction in security threats. Increased access security granularity on the user side (e.g., user-side process-level granularity), which may be referred to as micro-segmentation, may significantly reduce security threats to access server-side resources. For example, if a machine gets compromised, an attacker may be prevented from sending traffic to a private resource, e.g., because traffic is only allowed from the specified process with a specified signature. Changing the process changes the signature of the process communicating with the private resource(s) 132, so traffic sent by the attacker would be blocked.

FIG. 5 shows an example of a graphical user interface for granular secure access to private resources, according to an example embodiment. A network/resource administrator may use private resource security policy menu 500 to create and/or manage security policies 108, 122 for private resource(s) 132. As shown, an admin may specify private resources and access management for the private resources, which may include user identities, process identities, port ranges, etc.

Private resource security policy menu 500 is one of many possible examples. Embodiments disclosed herein and other embodiments may operate in accordance with example security policy menu 500 and/or other other menus. Other structural and operational embodiments will be apparent to persons skilled in the relevant art(s) based on the foregoing discussion of embodiments. No interface or operations, steps or other use of interfaces shown in example menu 500 are required unless expressly indicated or inherently required. No order of operations or other use of interfaces in example menu 500 are required unless expressly indicated or inherently required. There is no requirement that an embodiment implement all of the interfaces illustrated in example menu 500. In various implementations, interfaces may be added, removed, replaced/implemented in the alternative, e.g., in any combination or order. Example menu 500 is simply one of many possible embodiments. Embodiments may implement fewer, more or different interfaces.

As shown in FIG. 5, a security admin may describe one or more private resources in interfaces 502-506 (e.g., for zero or more security policies. Implementation (e.g., specification and/or enforcement) of one or more security policies that distinguish access to private resource(s) 132 from access to private network 126 may be referred to as resource (e.g., application) segmentation. For example, in interface 502, an admin may indicate name(s) of private resource(s) 132 (e.g., application(s)). In interface 504, an admin may indicate the type(s) of private resource(s) 132 (e.g., Web app). In interface 506, an admin may indicate the source(s)

of private resource(s) 132, for example, by indicating an IP address, IP range, IP prefix, a fully qualified domain name (FQDN), domain name, etc.

As shown in FIG. 5, a security admin may describe access management in interfaces 508-516 for the one or more resources described in interfaces 502-506. For example, in interface 508, an admin may indicate whether client access to the specified private resource(s) 132 is managed or unmanaged. In interface 510, an admin may indicate connector group(s) (e.g., default—North America) to connect to private resource(s) 132. In interface 512, an admin may indicate access type(s) (e.g., local/on-premises, remote/off-premises, proxy) to private resource(s) 132. In interface 514, an admin may indicate conditions for intelligent access/traffic routing from client computing device(s) 112, 136 to private resource(s) 132. In interface 516, an admin may indicate whether access is based on user identity and/or process identity. For example, an admin may indicate in interface 518 that access is based on both user identity and process identity.

As shown in FIG. 5, a security admin may describe user identity in interface 518 to indicate one or more users allowed to access the one or more resources described in interfaces 502-506. For example, in interface 518, an admin may indicate user(s) or user group(s) allowed to access resource(s). A default (e.g., without entry) may be, for example, a default group of users, all users of private network 126, or no users.

As shown in FIG. 5, a security admin may describe process identity in interfaces 520-526 to describe the identity of one or more processes allowed to access the one or more resources described in interfaces 502-506. For example, in interface 520, an admin may indicate client-side process (e.g., subprocess) name(s) for processes allowed to access private resource(s) 132. In interface 522, an admin may indicate process signature(s) (e.g., hash or signing certificate thumbprint) for the client-side process. In interface 524, an admin may indicate one or more process versions for the client-side process. In interface 526, an admin may indicate one or more process publishers for the client-side process.

As shown in FIG. 5, a security admin may describe port ranges in interfaces 528 and 530 for access to private resource(s) 132. For example, in interface 528, an admin may indicate whether a port range is provided for a connection-oriented logical port (e.g., TCP) or a connectionless-oriented logical port (e.g., user datagram protocol (UDP)). In interface 530, an admin may indicate the port range(s) for the TCP or UDP port indicated in interface 528.

As shown by example in FIG. 5, customization may be permitted in a security policy GUI. A security admin may link server-side security with process-level segmentation on the user side. A private resource access security policy may have micro-granularity, such as user-side process-level granularity. For example, a micro-segmented security policy may indicate what can access private resource(s) 132 (e.g., a segmented application that may be defined in example menu 500). Private resource(s) 132 (e.g., application(s)) may be referred to as the destination or target of access. A micro-segmented security policy (e.g., specified for one or more users and/or computing devices) may indicate which process(es) 113, 137 may be used to access private resource(s) 132. A process may be indicated, for example, by specifying a binary/executable file (e.g., *.exe) and/or by other indications of a process. A process signature may be a digital signature of an application with a thumbprint (e.g., key identifier).

The same user using one or more different process(es) may have different access to private resource(s) 132. In some examples, an application may be (e.g., defined or specified as) a combination of one or more process (e.g., binary) names and/or one or more subprocess names, e.g., with one or more of the following: one or more code signing signatures (e.g., thumbprints), version of the binary, publisher, etc. In various implementations, private resource(s) may include first party and/or third party applications.

Security policies may be based on how a process is executed, or the environment in which it is executed. For example, an application can run in a trusted mode or an untrusted mode, which may be different processes identified by different signatures (e.g., a first signature for an application run in untrusted mode and a second signature for the application run in trusted mode).

In some examples, a security policy may indicate user A, using computing device B executing process(es) (e.g., and/or subprocess(es)) C may access private resource D (e.g., a private application). A security policy may describe a client-side process by a specific code signing signature. In some examples, a security policy may indicate user A, using computing device B executing process C with process signature S (e.g., a signing signature thumbprint, etc.) may access private resource D.

In some examples, traffic may be routed based on user-side process-segmentation. For example, a security administrator can define applications with particular binaries and indicate routing from a security client as local or remote (e.g., through a security engine) to private resource(s) 132. Security policies may be entered and/or rendered in a policy table, which may indicate multiple private resources and available or selected security policies for each private resource, which may include bypass, local routing, edge routing, etc.

Security policy application/enforcement (e.g., micro-segmented security policy enforcement) may be performed by a security client and/or a security engine. For example, security client 114 may obtain details about process(es) 113, which may or may not be provided to security engine(s) 124. Security client 113 and/or security engine(s) 124 may determine whether traffic generated by process(es) 113 is sent to public service edge 118 and/or whether public service edge 118 forwards the traffic to connector(s) 130. Similarly, security client 138 may obtain details about process(es) 137, which may or may not be provided to security engine(s) 124 or to a security engine in private service edge 134 or data center(s) 104. Security client 138 and/or security engine(s) 124 (or security engine in private service edge 134 or data center(s) 104) may, based on details about process(es) 137, determine whether traffic generated by process(es) 137 should be sent to public service edge 118, private service edge 134, data center(s) 104, or to private resource(s) 132 and/or whether public service edge 118, private service edge 134, or datacenter(s) 104 forwards the traffic to connector(s) 130 or to private resource(s) 132.

In various examples, security client 114, 138 or security engine(s) in public/private service edge 118, 134 or data center(s) 104 may enforce security policy determinations. In some examples, security client 114 or 138 may enforce security policy determinations for efficiency (e.g., to avoid using bandwidth sending traffic that would otherwise be rejected by security engine(s) in public service edge 118, private service edge 134 or data center(s) 114). In some examples, security client 138 may enforce security policy determinations based on intelligent access routing (e.g., allowed in interface 514) and a location determination (e.g., trusted network detection), e.g., to perform local access routing of traffic from process(es) 137 to private resource(s) 132.

FIG. 6 shows a flowchart of an example method 600 for granular secure access to private resources, according to an example embodiment. Embodiments disclosed herein and other embodiments may operate in accordance with example method 600. Method 600 comprises steps 602-610. However, other embodiments may operate according to other methods. Other structural and operational embodiments will be apparent to persons skilled in the relevant art(s) based on the foregoing discussion of embodiments. No steps are required unless expressly indicated or inherently required. No order of steps is required unless expressly indicated or inherently required. There is no requirement that a method embodiment implement all of the steps illustrated in FIG. 6. In various implementations, steps may be added, removed, implemented in the alternative, e.g., in any combination or order. FIG. 6 is simply one of many possible embodiments. Embodiments may implement fewer, more or different steps.

As shown in FIG. 6, in step 602, a user identity of a user using a client computing device is determined. For example, as shown in FIG. 1, security client 114 may determine or receive user identity credentials for OTN user(s) 102. Public service edge 118 may receive the user identity from security client 114.

As shown in FIG. 6, in step 604, a process identity for a process executed by the client computing device is determined. For example, as shown in FIG. 1, security client 114 may itself determine one or more process identities for process(es) 113 or may receive one or more process identities for process(es) 113 which security client 114 determines as the one or more process identities. Public service edge 118 may receive the one or more process identities from security client 114.

As shown in FIG. 6, in step 606, an indication of at least one security policy indicating whether the combination of the user identity and process identity authorizes the client computing device to use the private resource is received. For example, as shown in FIG. 5, a security admin may provide an indication of at least one security policy for access by OTN user(s) 102 using process(es) 113 to private resource(s) 132, which may include indicating in interface 516 that access is based on both user identity and process identity. The indication of at least one security policy may be received by a security engine in public service edge 118, private service edge 134, or data center(s) 104, or a security client in OTN computing device(s) 112 or ITN computing device(s) 136. The indication of at least one security policy may be stored, for example, in security policies 108, 122.

As shown in FIG. 6, in step 608, an access determination (e.g., based on the at least one security policy) indicating whether a combination of the user identity and process identity authorizes the client computing device to use a private resource in a private network is determined. For example, as shown in FIG. 1, a security engine in public service edge 118 (e.g., security engine(s) 124), private service edge 134, or data center(s) 104 (e.g., security engine(s) 110), or a security client in OTN computing device(s) 112 (e.g., security client 114) or ITN computing device(s) 136 (e.g., security client 138) may make or receive an access determination (e.g., based on the at least one security policy) indicating whether a combination of the user identity and process identity authorizes the client computing device to use private resource(s) 132 in private network 126.

As shown in FIG. 6, in step 610, the access determination may be enforced. For example, as shown in FIG. 1, a security engine in public service edge 118 (e.g., security engine(s) 124), private service edge 134, or data center(s) 104 (e.g., security engine(s) 110), or a security client in OTN computing device(s) 112 (e.g., security client 114) or ITN computing device(s) 136 (e.g., security client 138) may enforce the access determination. Enforcement by a security client may reduce unnecessary traffic on network(s) 116 and enforcement at a security engine in public service edge 118 (e.g., security engine(s) 124), private service edge 134, or data center(s) 104 (e.g., security engine(s) 110).

III. Example Computing Device Embodiments

As noted herein, the embodiments described, along with any modules, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

FIG. 7 shows an exemplary implementation of a computing device 700 in which example embodiments may be implemented. Consistent with all other descriptions provided herein, the description of computing device 700 is a non-limiting example for purposes of illustration. Example embodiments may be implemented in other types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing example embodiments described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of example embodiments described herein. Accordingly, such computer programs represent controllers of the computing device 700.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems and computer program products are provided for granular secure user access to private resources. Increased granularity of security policies for user access may reduce security threats to resources. Security policies indicating user access to secure resources may be based on various combinations of user identities, client-side process (e.g., sub-process) identities, device identities, device types, device locations, resource access types, intelligent access (e.g., selective traffic routing), etc. For example, a security policy may indicate user A, using computing device B executing process C with process signature S (e.g., a signing signature thumbprint, etc.) may access private resource D. A process identity may be indicated by at least one of a process name, a code signing signature, a thumbprint, a process version, or a process publisher. Resource access security policy determinations and/or enforcement may be performed by security clients and/or security engines (e.g., SASE providing ZTNA).

In examples, a computing system may comprise at least one of a client computing device and/or a server providing a security service. The client computing device may be configured to: (a) receive a user identity, (b) execute a process with a process identity, and (c) execute a security client configured to perform at least one of: (i) provide the user identity credential and process identity to a server providing a security service configured to provide secure access to a resource on a private network or (ii) apply at least one security policy to make an access determination whether a combination of the user identity and process identity authorizes the client computing device to use the resource. The server providing the security service may be configured to: (a) receive the user identity and the process identity and (b) apply the at least one security policy to make an access determination whether a combination of the user identity and process identity authorizes the client computing device to use the resource.

In examples, the security service may comprise a secure access service edge (SASE) providing zero trust network access (ZTNA) for the resource in the private network and the security client may comprise s a ZTNA client.

In examples, the client computing device may be configured to make the access determination.

In examples, the server providing the security service may be configured to make the access determination.

In examples, the client computing device is configured to enforce the access determination.

In examples, the server providing the security service may be configured to enforce the access determination.

In examples, the process identity may be indicated by at least one of a process name, a process signature, a process version, or a process publisher.

In examples, the process may comprise at least one subprocess.

In examples, the access determination may determine whether a client computing device is authorized to use the resource based on a combination of the user identity and process identity in further combination with at least one of a location of the client computing device or traffic routing of traffic generated by the client computing device.

In examples, a computer-implemented method may comprise determining or receiving a user identity of a user using a client computing device; determining or receiving a process identity for a process executed by the client computing device; and determining or receiving an access determination indicating whether a combination of the user identity and process identity authorizes the client computing device to use a private resource in a private network.

In examples, the security service may comprise s a secure access service edge (SASE) providing zero trust network access (ZTNA) for the resource in the private network and the security client may comprise s a ZTNA client.

In examples, a computer-implemented method may (e.g., further) comprise receiving an indication of at least one security policy indicating whether the combination of the user identity and process identity authorizes the client computing device to use the private resource, wherein the access determination is based on the at least one security policy.

In examples, the access determination may be determined by the client computing device.

In examples, the access determination may be determined by a server providing a security service.

In examples, the access determination may indicate whether a combination of the user identity and process identity in further combination with at least one of a location of the client computing device or traffic routing of traffic generated by the client computing device authorizes the client computing device to use the resource.

In examples, a computer-implemented method may (e.g., further) comprise enforcing the access determination.

In examples, the client computing device may enforce the access determination.

In examples, the server with the security service may be configured to enforce the access determination.

In examples, the process may comprise at least one subprocess.

In examples, a computer-readable storage medium may have program instructions recorded thereon that, when executed by a processing circuit, perform a method. The method may comprise, for example: determining or receiving a user identity of a user using a client computing device; determining or receiving a process identity for a process executed by the client computing device; and determining or receiving an access determination indicating whether a combination of the user identity and process identity authorizes the client computing device to use a private resource in a private network.

In another example, a computing system comprises a client computing device configured to: (a) receive a user identity, (b) execute a process with a process identity, and (c)

execute a security client configured to perform at least one of: (i) provide the user identity credential and process identity to a server providing a security service configured to provide secure access to a resource on a private network, or (ii) apply at least one security policy to make an access determination whether a combination of the user identity and process identity authorizes the client computing device to use the resource.

In an example, the computing system further comprises: the server providing the security service configured to: (a) receive the user identity and the process identity, and (b) apply the at least one security policy to make the access determination whether a combination of the user identity and process identity authorizes the client computing device to use the resource.

In an example, the security service comprises a secure access service edge (SASE) providing zero trust network access (ZTNA) for the resource in the private network and the security client comprises a ZTNA client.

In an example, the client computing device is configured to make the access determination.

In an example, the server providing the security service is configured to make the access determination.

In an example, the client computing device is configured to enforce the access determination.

In an example, the server providing the security service is configured to enforce the access determination.

In an example, the process identity is indicated by at least one of a process name, a process signature, a process version, or a process publisher.

In an example, the access determination determines whether a combination of the user identity and process identity in further combination with at least one of a location of the client computing device or traffic routing of traffic generated by the client computing device authorizes the client computing device to use the resource.

In another example, a computer-implemented method comprises determining a user identity of a user at a client computing device; determining a process identity for a process executed by the client computing device; and determining an access determination indicating whether a combination of the user identity and process identity authorizes the client computing device to use a private resource in a private network.

In an example, the security service comprises a secure access service edge (SASE) providing zero trust network access (ZTNA) for the resource in the private network and the security client comprises a ZTNA client.

In an example, the computer-implemented method further comprises: receiving an indication of at least one security policy indicating whether the combination of the user identity and process identity authorizes the client computing device to use the private resource, wherein the access determination is based on the at least one security policy.

In an example, the access determination is determined by the client computing device.

In an example, the access determination is determined by a server providing a security service.

In an example, the access determination indicates whether a combination of the user identity and process identity in further combination with at least one of a location of the client computing device or traffic routing of traffic generated by the client computing device authorizes the client computing device to use the resource.

In an example, the computer-implemented method further comprises enforcing the access determination.

In an example, the client computing device enforces the access determination.

In a still further example, a computing system comprises: a server that provides a security service configured to: (a) receive a user identity and a process identity of a process executed by a client computing device, and (b) apply the at least one security policy to make an access determination whether a combination of the user identity and process identity authorizes the client computing device to use a resource on a private network.

In an example, the security service comprises a secure access service edge (SASE) providing zero trust network access (ZTNA) for the resource in the private network and a security client in the client computing device comprises a ZTNA client.

In an example, the access determination determines whether a combination of the user identity and process identity in further combination with at least one of a location of the client computing device or traffic routing of traffic generated by the client computing device authorizes the client computing device to use the resource.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computing system, comprising:
a client computing device configured to:
    receive a user identity of a user, the user identity including a username,
    execute a process with a process identity,
    access a first security policy that indicates whether a combination of the process identity and the user identity is authorized to access a resource, the process corresponding to the process identity used in an attempt to access the resource,
    execute a security client configured to apply the first security policy,
    utilize the security client to make a first access determination whether the combination of the user identity and the process identity authorizes the client computing device to access the resource, wherein an authorization results in granting access to the resource while limiting access to other resources accessible on a network that includes the resource and the other resources, and
    enforce the first access determination.

2. The computing system of claim 1, further comprising:
a server providing a security service configured to:
    receive the user identity and the process identity, and
    apply a second security policy to make a second access determination whether a combination of the user identity and process identity authorizes the client computing device to access the resource.

3. The computing system of claim 2, wherein the security service comprises a secure access service edge (SASE)

providing zero trust network access (ZTNA) for the resource in the private network and the security client comprises a ZTNA client.

4. The computing system of claim 1, wherein the process identity is indicated by at least one of a process signature, a process version, or a process publisher.

5. The computing system of claim 1, wherein the first access determination determines whether a combination of the user identity and process identity in further combination with at least one of a location of the client computing device or traffic routing of traffic generated by the client computing device authorizes the client computing device to access the resource.

6. A computer-implemented method, comprising:

determining a user identity of a user at a client computing device, the user identity including a username;

determining a process identity for a process executed by the client computing device;

executing, by the computing device, a security client;

utilizing the security client to make a first access determination that the combination of the user identity and the process identity satisfies a first security policy;

utilizing the security client to provide the user identity and the process identity to a service edge device that enforces a second security policy that indicates whether a combination of the process identity and the user identity is authorized to access a private resource, the process corresponding to the process identity used in an attempt to access the private resource, and receiving, from the service edge device, a second access determination of whether the combination of the user identity and the process identity authorizes the client computing device to access the private resource in a private network, wherein an authorization results in granting access to the private resource while limiting access to other resources accessible on the private network that includes the private resource and the other resources.

7. The computer-implemented method of claim 6, wherein the security service edge device comprises a secure access service edge (SASE) providing zero trust network access (ZTNA) for the private resource in the private network and the security client comprises a ZTNA client.

8. The computer-implemented method of claim 6, further comprising:

receiving an indication of at least the second security policy indicating whether the combination of the user identity and process identity authorizes the client computing device to access the private resource, wherein service edge device performs the second access determination based on the second security policy.

9. The computer-implemented method of claim 6, wherein the second access determination indicates whether a combination of the user identity and process identity in further combination with at least one of a location of the client computing device or traffic routing of traffic generated by the client computing device authorizes the client computing device to access the private resource.

10. The computer-implemented method of claim 6, further comprising:

enforcing, by the service edge device, the second access determination.

11. The computer-implemented method of claim 6, wherein the client computing device enforces the second access determination.

12. A computing system comprising:

a server, which includes a processor and a storage device, that provides a security service configured to:

receive a user identity of a user, the user identity including a username, and a process identity of a process executed by a client computing device, the combination of the process identity and the user identity satisfying a first security policy enforced by a security client executed by the client computing device, access a second security policy that indicates whether the combination of the process identity and the user identity is authorized to access a resource, the process corresponding to the process identity used in an attempt to access the resource, and apply the second security policy to make an access determination whether a combination of the user identity and process identity authorizes the client computing device to access a resource on a private network, wherein an authorization results in granting access to the resource while limiting access to other resources accessible on the network that includes the resource and the other resources.

13. The computing system of claim 12, wherein the security service comprises a secure access service edge (SASE) providing zero trust network access (ZTNA) for the resource in the private network and a security client in the client computing device comprises a ZTNA client.

14. The computing system of claim 12, wherein the access determination determines whether a combination of the user identity and process identity in further combination with at least one of a location of the client computing device or traffic routing of traffic generated by the client computing device authorizes the client computing device to access the resource.

15. The computing system of claim 1, wherein the process identity comprises a process signature indicating the process is running in a trusted mode, and the first security policy specifies whether the resource can be accessed by the process running in the trusted mode.

16. The computing system of claim 1, wherein the process identity comprises a process signature indicating the process is running in a trusted mode, and the first security policy specifies whether the resource can be accessed by the process running in the trusted mode.

17. The computer-implemented method of claim 6, wherein the process identity comprises a process signature of the process and wherein said utilizing the security client to make the first access determination comprises:

utilizing the security client to determine the process signature satisfies the first security policy.

18. The computer-implemented method of claim 6, wherein the process identity comprises a process signature of the process and wherein the second security policy indicates whether a combination of the process signature and the user identity is authorized to access the private resource.

19. The computer-implemented method of claim 18, wherein the process signature corresponds to the process running in an untrusted mode.

20. The computing system of claim 12, wherein the process identity comprises a process signature of the process and wherein the second security policy indicates whether a combination of the process signature and the user identity is authorized to access the private resource.

* * * * *